United States Patent [19]

Pachynski, Jr.

[11] 4,054,747

[45] Oct. 18, 1977

[54] DATA BUFFER

[75] Inventor: Alvin L. Pachynski, Jr., Palo Alto, Calif.

[73] Assignee: GTE Automatic Electric Laboratories Incorporated, Northlake, Ill.

[21] Appl. No.: 687,979

[22] Filed: May 20, 1976

[51] Int. Cl.² .................................................. H04L 7/00
[52] U.S. Cl. ............................................................ 178/69.1
[58] Field of Search .................... 178/69.5 R, 69.1; 179/15 BS, 15 BA; 325/38; 307/238; 340/174 SD

[56] References Cited

U.S. PATENT DOCUMENTS

| 3,531,777 | 9/1970 | West | 178/69.5 R |
|---|---|---|---|
| 3,803,356 | 4/1974 | Hausmann | 178/69.5 R |
| 3,867,579 | 2/1975 | Colton et al. | 178/69.5 R |

Primary Examiner—Thomas A. Robinson

Attorney, Agent, or Firm—Leonard R. Cool; Russell A. Cannon

[57] ABSTRACT

A data buffer makes use of a plurality of buffer storage cells into which serial bit streams are sequentially written, in order to obtain correction for phase jitter. A write clock signal is derived from the serial bit stream and is used to sequentially write the digits into the cells. A stable clock source is used to provide the basic timing for sequentially reading the bits out from the buffer storage cells, and a logic circuit is used in conjunction therewith to obtain the retimed serial bit stream. The write and read timing signals should have a maximum time separation to allow for maximum correction of phase jitter, and it is critical that the write and read signals should alternate. A monitor and reset circuit compares a selected write signal with a selected read signal and, where a violation of the alternating write-read condition occurs, the circuit resets the write timing and holds it until the read timing has attained a particular state.

9 Claims, 6 Drawing Figures

DATA BUFFER

BACKGROUND OF INVENTION

1. Field of Invention

This invention relates to pulse transmission systems and in particular to the retiming of serial bit streams to reduce phase distortion (jitter) introduced by transmission via an imperfect transmission medium.

2. Description of the Prior Art

In prior-art devices, the basic timing information was derived from the serial bit stream itself. Retiming was accomplished by controlling the frequency of a local oscillator by the phase difference between the incoming pulse train and the local oscillator output. Thus, phase jitter was reduced by allowing the local oscillator to smooth out the phase differences in the phase of the incoming bit stream.

An improvement over the above-described prior-art technique is disclosed in U.S. Pat. No. 3,093,815. In accordance with the invention therein described, coarse retiming is accomplished in much the same manner as is discussed for the above-described prior-art technique. This coarse timing information was utilized to write the successive elements of a serial bit stream into one of a number of the buffer storage cells in a fixed, cyclic order. At a later time, for example half of the period of a storage cycle, this information was read from the buffer storage elements under the control of a highly stabilized local clock. The clock frequency, and hence the read-out rate, was controlled by a signal representing the average amount of information stored in the buffer storage cells at any particular time. Thus, the local clock rate was made responsive to the average amount of data in the buffer storage cells, to prevent an undue accumulation or depletion from the buffer store.

A principal disadvantage of the patented technique is the complexity and, hence, cost of deriving a control signal which represents the average amount of information stored in the buffer storage cells at any particular instant and in using this signal to control the "local clock" frequency. Such prior-art arrangements employ circuitry which provides for constant write/read comparisons and for frequency adjustment of a voltage-controlled oscillator used as a read clock. It is a purpose of this invention to retain the retiming feature, i.e., phase jitter reduction and fixed phase compensation without the need for constant write/read phase comparison and frequency adjustment of the "read" voltage-controlled oscillator.

SUMMARY OF THE INVENTION

A retiming circuit for reducing the phase jitter in a serial bit stream generates N write timing signals, each having a rate which is 1/N that of the serial bit streams. The N write timing signals are used to sequentially write individual bits into one of N buffer storage cells in a cyclic order. A stable clock source having a rate equal to that of the serial bit stream is used as a reference for the N read timing signals which sequentially read the individual bits out of the buffer storage cell in retimed serial form.

The write/read sequence should alternate, and the maximum possible separation in time should occur between the write/read sequences so as to permit correction of a maximum of phase distortion for each bit. A monitor and reset circuit compares a selected write timing signal with a selected read timing signal to determine if the alternating write/read sequence has been violated. Violations occur if more than one read timing signal occurs between two sequential write timing signals; or, if two write timing signals occur between two sequential read timing signals. When this happens, the monitor and reset circuit resets one timer to a first predetermined timing signal position and holds it in this condition until the other timer reaches a second predetermined timing signal condition.

BRIEF DESCRIPTION OF THE DRAWING

FIG. 4 is a block diagram of the digital monitor and reset circuit used in the preferred embodiment of the invention.

DETAILED DESCRIPTION OF THE INVENTION

Figure 1:
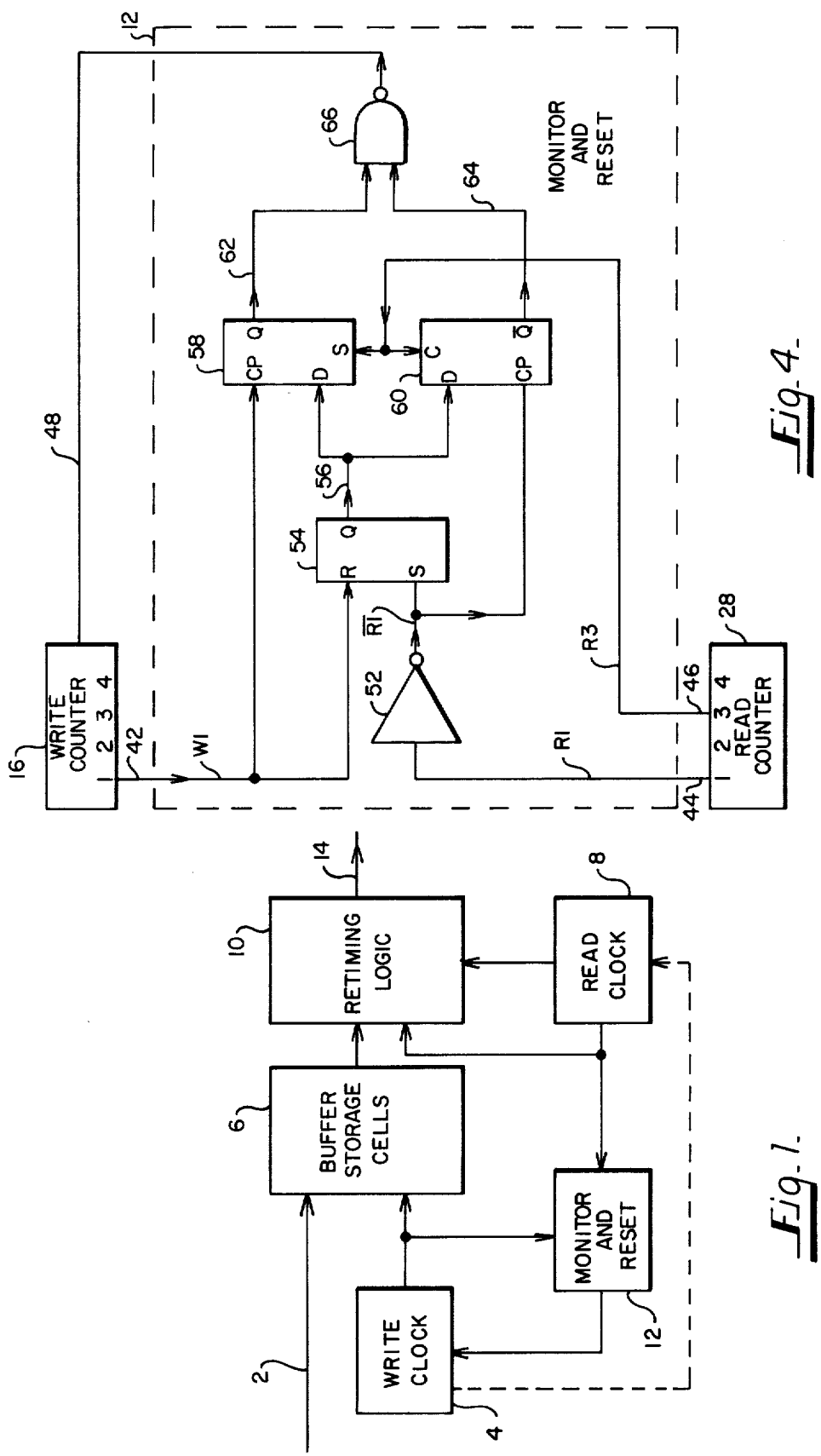
FIG. 1 is a block diagram showing the interconnection of the basic elements of the invention.

Referring to FIG. 1, the incoming bit stream appears at path 2 and is applied to the buffer storage cells included in block 6. Write clock 4 actually writes the separate bits sequentially into cells of a storage device. The write clock also provides an output to the monitor and reset circuit 12. The read clock 8 sequentially reads the separate bits stored in the individual cells of buffer storage 6 through retiming logic and into the output path 14, providing a retimed output which reduces the phase jitter which occurs at the incoming bit stream on path 2. Read clock 8 also provides inputs to the monitor and reset circuit 12 which, in combination with the write clock, determines if the write and read timing pulses alternate or if there are occurrences of a plurality of write pulses intervening between read pulses and/or a plurality of read pulses occurring between adjacent write pulses. In the latter events, one clock is reset. In the diagram of FIG. 1, it is the write clock which is reset; however, it will become apparent later that either clock may be reset. Further, the write clock timing may be derived from the incoming bit stream. Also, the write clock output may be used as an input to control the clock rate of the read clock so that the average rate of the read clock is equal to the average rate of the write clock. The read and write frequencies are the same, but the phase relationship will vary. It is this effect that is controlled by the subject data buffer so as to minimize phase jitter at the output. This is explained in more detail with respect to FIG. 4.

Figure 2:
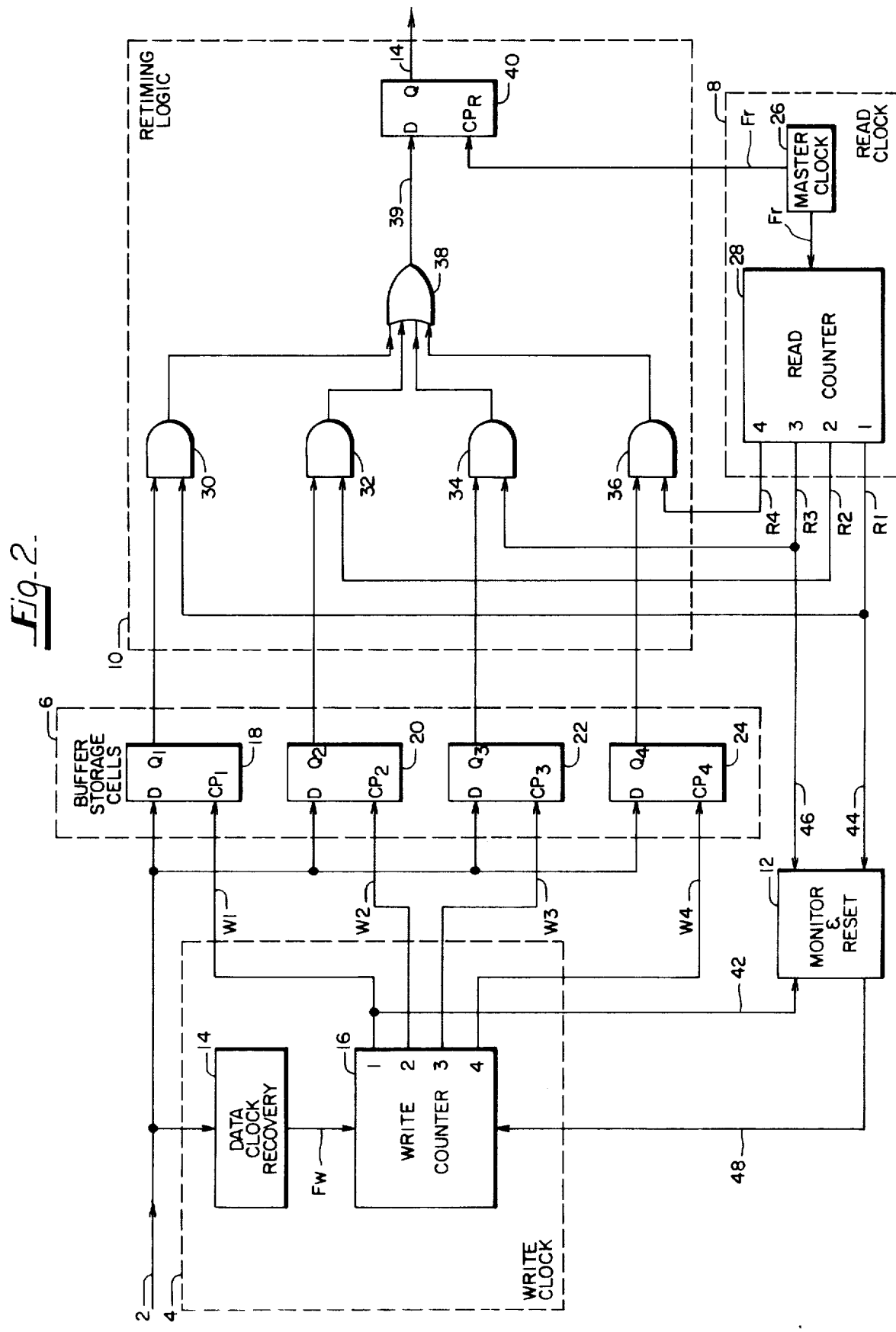
FIG. 2 is a more detailed block diagram which illustrates a preferred embodiment of the invention.
Figure 3:
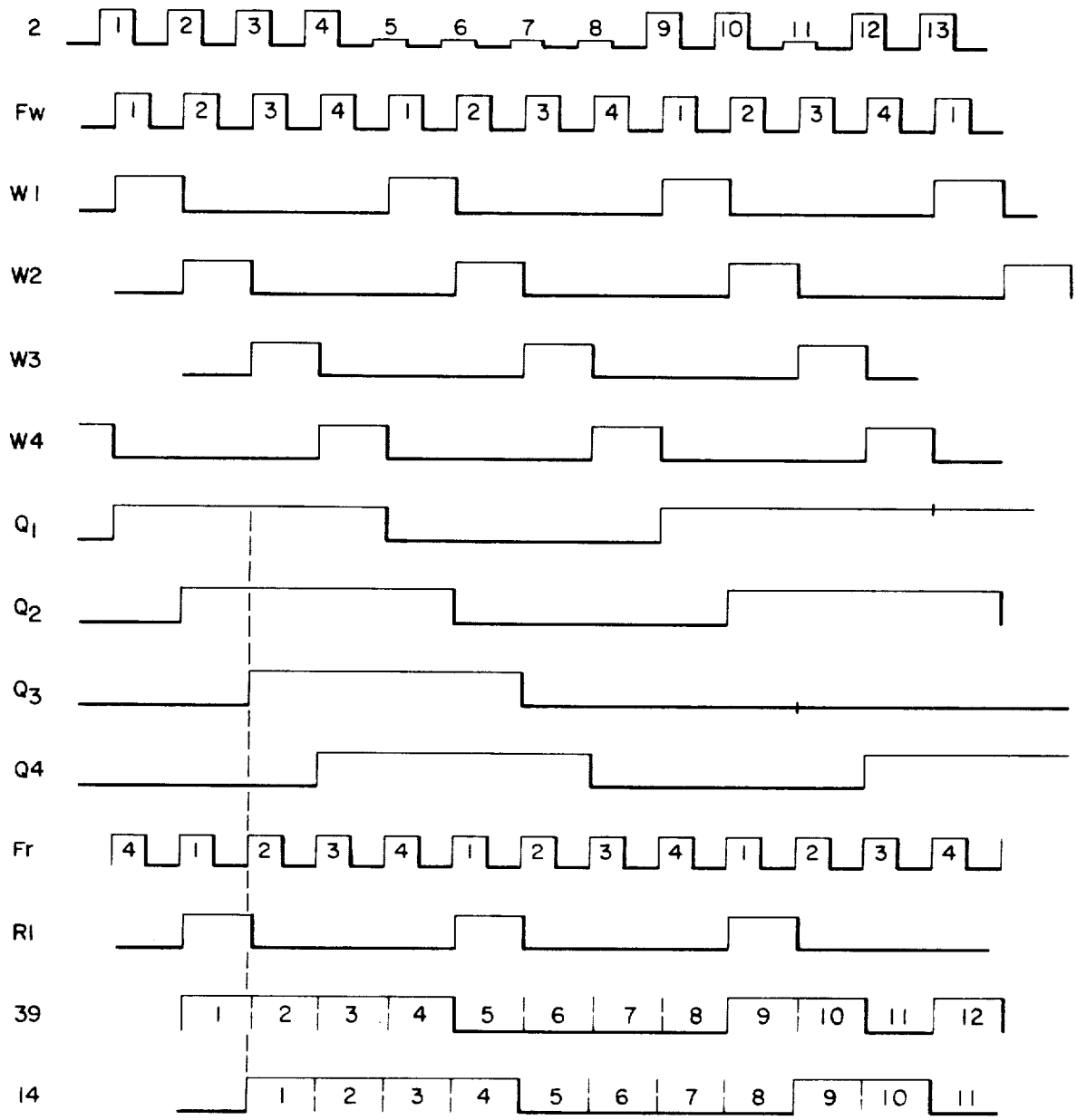
FIG. 3 is a waveform diagram which shows the retiming process of the preferred embodiment of FIG. 2.

Referring now to FIG. 2, an incoming serial bit stream at rate $f_w$ is simultaneously applied to each of the D-inputs of buffer storage 6. In this embodiment, four D-type flip-flops are used as storage cells, although it should be understood that more or less cells may be used depending upon the time interval over which correction is to be obtained. Also, the incoming bit stream is applied to a data clock recovery circuit 14 which develops the output frequency $f_w$ which is applied to write counter 16. Write counter 16 provides four timed outputs at one fourth the rate of clock $f_w$. This is shown diagrammatically by waveforms $f_w$ and W1 through W4 in FIG. 3 where the designations at the left of the drawing refer to the actual path and/or output designations as shown on FIG. 2. For example, W1 is the output 1 from the write counter and also illustrates the path interconnecting the write counter with the clock pulse input of flip-flop 18. The $Q_1$ output is the output of flip-flop 18 at the Q-output of this D-type flip-flop. While it would normally be expected that the incoming serial bit stream would include phase jitter, none is shown in FIG. 3 in order that the various relationships of the waveforms may be illustrated without adding this complexity. The incoming serial bit stream is sequentially gated by the write pulses from a counter such as a ring counter into the cells 18, 20, 22, and 24. As illustrated in FIG. 3, the incoming pulses are stored for a period of four pulse periods as illustrated by waveforms $Q_1 - Q_4$. Thus, the data bit of any one cell is available to be read out for a total time of four clock periods. This allows jitter and delay variations of much greater than one clock period and, in fact, can theoretically approach four clock periods in duration.

Read clock 8 is shown as comprising a master clock 26 having a fequency $f_r$, which frequency would nominally be equal to $f_w$. The master clock applies the $f_r$ timing frequency to the read counter which provides the four read timing outputs $R_1$ through $R_4$ to read the data out from the individual storage cells. Although the data clock 14 and the master clock 26 are shown as being independent, they must be at the same frequency, but may vary in their phase relationship, i.e., jitter and fixed phase difference. In FIG. 3, they are shown to be at the same frequency and phase. However, the phase relationship for the read counter outputs is such as to give the optimum phase relationship between the read and write counters. This is shown by the cyclic notation within the clock pulses of the $f_w$ and $f_r$ waveforms.

As shown in FIG. 3, the data bit is written into cell 18 on the positive transition of the leading edge of the read pulse $W_1$. A time delay is not illustrated between the data clock frequency positive transition and the read pulse outputs $W_1-W_4$. This delay was not shown because there is no requirement to establish a particular phase delay relationship between the data clock frequency $f_w$ and the write pulses. However, with respect to the master clock 26 output frequency $f_r$, it is important that the delay be shown, and this is illustrated by a shift of the read output $R_1$ as illustrated in FIG. 3. The $Q_1$ bit is read out by the read clock pulse $R_1$, and it should be noted that this occurs just subsequent to the clock pulse which generates the $R_1$ read pulse. Because of the coincidence of the $Q_1$ and $R_1$ inputs to AND-gate 30, the $Q_1$ output appears on path 39 as illustrated in FIG. 3. Since the readout of flip-flop 40 will not occur until the next input clock pulse from master clock 26, the serialized output is delayed as illustrated in FIG. 3 at 14. Note that the relationship between the serialized output and the stored pulse in cell 18 is such that this occurs at the middle of the storage interval. This then illustrates an optimum relationship between the write and read pulse occurrences.

In the circuit shown in FIG. 2, a master clock may be used to provide the $f_w$ and $f_r$ clock pulses for operating both the write and read counters. In this case, they will run synchronously but with a fixed and unpredictable phase relationship. For example, while data are being written into cell 18, the read counter could be reading any one of the four cells. In order to allow maximum phase jitter, in this case, the read counter should be reading out of cell no. 22. This write/read relationship is as illustrated in FIG. 3. However, it is possible, even in this case, that the read counter could be reading out from a memory cell as the same instant in time that the cell is being written into. This could produce errors. To ensure optimum phasing between the write and read counters, it is necessary that a technique be provided that will reset one or both of these counters to achieve this optimum phase relationship. In the block diagrams of FIGS. 1 and 2, this is shown as a monitor and reset 12. The monitor and reset circuit is shown in more detail in FIG. 4.

Figure 5:
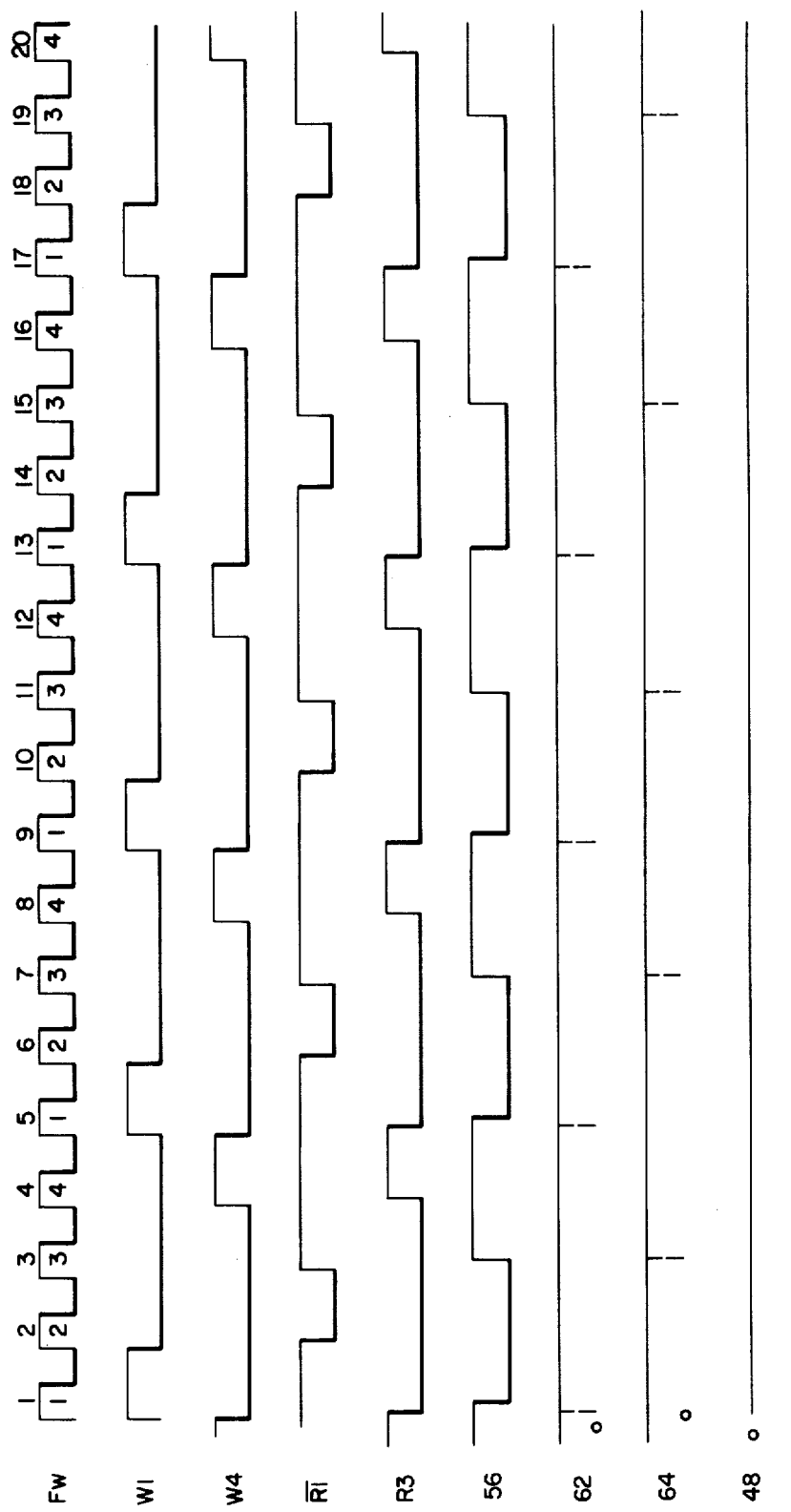
FIG. 5 is a waveform diagram which shows the waveforms at pertinent points of FIG. 4 when $f_w$ has uniform pulses.

The monitor and reset circuit 12, illustrated in FIG. 4, compares the write output $W_1$ from path 42 with the read counter output $R_1$ over path 44 to ensure that there are never two consecutive write pulses or read pulses for an individual memory cell without an intervening read or write pulse therebetween. In other words, the write and read pulses for any cell must form an alternating sequence. The write $W_1$ pulse is applied simultaneously to the R-input of the R-S flip-flop 54 and to the clock pulse input of D-type flip-flop 58. The R1 input from read counter 28 is inverted in inverter 52, and the output of 52 is applied simultaneously to the S-input of R-S flip-flop 54 and to the clock pulse input of D-type flip-flop 60. The R-S flip-flop 54 is toggled only by the positive-going edge of the R and S inputs. FIG. 5 illustrates the normal relationship for an optimum write-read phase relationship such as is shown in FIG. 3. Note that in this case the write pulse $W_1$, when applied to flip-flop 54 and to flip-flop 58, provides a 1 output on lead 62. This occurs because the $\overline{R}_1$ has reset flip-flop 54, causing its Q-output on lead 56, and thus the input at D of flip-flop 58, to be a 1 prior to the occurrence of the write pulse $W_1$. When the write pulse $W_1$ appears at a later time, this is read through to the Q-output, and thus the continuous output on lead 62 is a 1. Similarly, the output on lead 64 from flip-flop 60 is a 1, and thus the output of NAND-gate 66 is a 0, which is applied via lead 48 to the reset input of write counter 16. Thus, nothing occurs so far as the write counter 16 is concerned.

Figure 6:
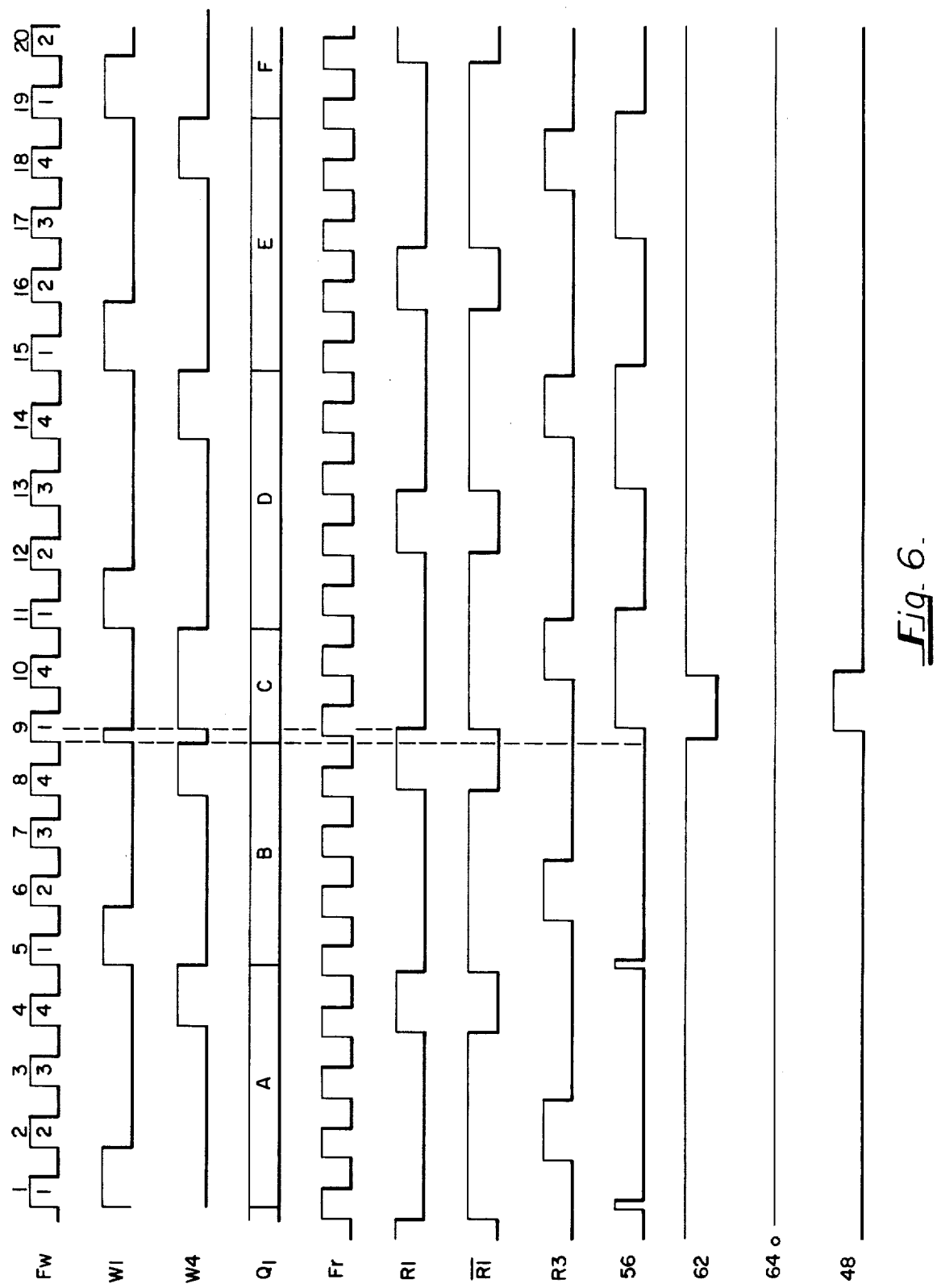
FIG. 6 is a waveform diagram which shows how the incoming bit stream is digitally retimed by action of the monitor and reset circuit.

However, it is possible for the phase relationship between $f_w$ and $f_r$ to shift such that the bit in memory cell 18, for example, is being read out just prior to the time that new data is being written into that memory cell. This is acceptable as long as the read clock $R_1$ does not shift to the right. If this happens, due for example to phase jitter in the write clock, a data error will result. This is illustrated graphically in the waveform diagram of FIG. 6. The bit $Q_1$ of cell 18, at time interval A, is being read just prior to the time that new data would be inserted into this buffer storage cell. However, at time period B, the write clock has shifted slightly to the left with respect to read clock, and as a result $R_1$ does not sample data bit B in cell 18. This produces a data bit omission, i.e., error in the data buffer output. The monitor and reset circuit detects this as follows. Referring to FIG. 6, just prior to $f_w$ clock pulse position no. 1 (see numerical designation above $f_w$), the $\overline{R}_1$ provides a positive transition to the input S of flip-flop 54, thus causing a 1 output on lead 56. When the write pulse $W_1$ is applied to the R-input of flip-flop 54 shortly thereafter, the output does not immediately change. Thus, the simultaneous application of write pulse $W_1$ to the clock pulse input of flip-flop 58 reads a 1 output on lead 62. Shortly thereafter, the output on lead 56 goes to zero, and therefore a short pulse is formed as illustrated in FIG. 6 at line 56. This occurs again at $f_w$ pulse position 5, but does not occur at $f_w$ pulse position 9 because of the phase shift in clock $f_w$. This will be discussed in more detail hereinbelow. With respect to flip-flop 60, it is apparent that the D-input is 0 at the time of occurrence of the next positive transition of $\overline{R}_1$. Thus, the $\overline{Q}$-output is a 1 on path 64 and is illustrated in FIG. 6 at 64. The two logic 1 inputs to NAND-gate 66 again provide a 0 output on path 48 and, thus reset the input of write counter 16.

If, for example, $W_1$ and $\overline{R}_1$ do not alternate, the following occurs. Referring to FIG. 6, the B time interval of $Q_1$, the write pulse $W_1$ has shifted in phase such that there are two consecutive $W_1$ pulses without an $\overline{R}_1$ pulse between them. Since the $W_1$ pulse that started time period B has not been followed by a $\overline{R}_1$ pulse, lead 56 is still at logic 0. The next $W_1$ pulse ($f_w$ clock cycle 9) clocks the 0 from lead 56 into flip-flop 58, which generates a 0 at its output 62. Thus, the inputs to NAND-gate 66 are 1 and 0, and therefore a 1 output appears on lead 48, which is applied to the reset input of write counter 16. This causes write counter 16 to be reset to count $W_4$ where it is held until the start of a read-count input $R_3$ on path 46 to the S (Set) and C (Clear) inputs of flip-flops 58 and 60, respectively. At this time, leads 62 and 64 both become logic 1 and the write counter 16 begins counting again, starting with $W_1$. As can be seen from the waveform diagrams of FIG. 6, in this example, the negative-going edge of the read pulse $R_1$ is now centered with respect to the time interval of cell 22, i.e., the phase relationship between the write and read timing signals has been reset to the optimum condition. If there are two consecutive $R_1$ pulses, without a $W_1$ pulse between, flip-flop 60 operates in the same manner as described hereinabove for flip-flop 58.

While the invention has been particularly shown and described with reference to a preferred embodiment thereof, it will be understood by those skilled in the art that changes in form and detail may be made without departing from the spirit and scope of the invention.

What is claimed is:

1. Apparatus for retiming a serial bit stream which comprises:
   a first timing means providing N sequentially timed outputs, each at a rate which is $1/N^{th}$ that of the bit rate of said serial bit stream,
   means for sequentially storing N binary digits, each said digit being written into said storing means by one of said N timed outputs from the first timing means;
   a second timing means including a clock means having an output which provides a clock rate at substantially the bit rate of said serial bit stream and having N sequentially timed outputs, each at a rate which is $1/N^{th}$ of said clock rate;
   logic means responsive to said second timing means for sequentially reading out the binary digits from said storage means; and
   monitoring means having one input connected to monitor one of the N sequential timed outputs of said first timing means, having second and third inputs connected to monitor two of the N timed outputs of said second timing means to determine if the write-read inputs alternate and to provide an output signal which resets the N sequential outputs of one said timing means in the event the write-read sequence does not alternate.

2. Apparatus in accordance with claim 1 wherein said first timing means further comprises:
   a second clock means having a clock pulse repetition rate which is equal to the bit rate of the incoming bit stream and providing a clock pulse output at said rate; and
   a first counting means having an input connected to the output of said second clock means, said counting means providing N outputs, each providing a timing signal at $1/N^{th}$ of the bit rate.

3. Apparatus in accordance with claim 2 wherein said sequential storing means further comprises:
   N memory cells, each having two inputs and an output, one said input of each cell being connected to receive said bit stream and the second input being connected to one of said N outputs of said first counting means.

4. Apparatus in accordance with claim 3 wherein said second timing means further comprises:
   a stable master clock having a clock pulse repetition rate which is equal to that of said second clock means; and
   a second counting means having an input connected to the output of said master clock, said counting means having N outputs, each providing a timing signal at $1/N^{th}$ of the master clock rate.

5. Apparatus in accordance with claim 4 wherein said logic means further comprises:
   N AND-gates, each having two inputs and an output, one said input being connected to one said output of one said memory cell, and the second said output being connected to one of said N outputs of said second counting means;
   an OR-gate having N inputs and an output, each input being connected to one said AND-gate output; and
   retiming means having one input connected to the output of said OR-gate and a second input connected to the output of said master clock whereby the bit stream is retimed.

6. Apparatus in accordance with claim 5 wherein said monitoring means further comprises:
   means for comparing a selected output from said first counting means with a selected output from said second counting means to determine if there is an alternating sequence; and
   means for resetting said first counting means when said alternating sequence is violated.

7. In a data buffer for retiming a serial bit stream, monitor and reset apparatus which comprises:
   a first counting means;
   a second counting means;
   means for comparing a selected output of said first counting means with a selected output of said second counting means to determine if there is an alternating sequence; and
   means for resetting said first counting means when said alternating sequence is violated.

8. Monitor and reset apparatus in accordance with claim 7 wherein said comparing means further comprises:
   a first flip-flop having a reset input connected to receive the selected output of said first counting means;
   inverting means having an input connected to receive the selected output from said second counting means and having an output connected to the set input of the first flip-flop; the output of said flip-flop being of one state when the selected outputs from said first and second counting means alternate and of the other state when they do not alternate.

9. Monitor and reset apparatus in accordance with claim 8 wherein said means responsive further comprises:
logic means having as one input the selected output from said first counting means, as a second input the selected inverted output from said second counting means, as a third input the output of said first flip-flop, and as a fourth input a second selected output from said second counting means; said logic means providing two outputs which are both of one like state when the first and second inputs occur alternately and are of opposite states otherwise; and
gating means responsive to the opposite states of said logic means to reset said first counting means.

* * * * *